(12) United States Patent
Ng et al.

(10) Patent No.: US 7,766,428 B2
(45) Date of Patent: Aug. 3, 2010

(54) VEHICLE SEAT AND A DISC RECLINER THEREFOR

(75) Inventors: Pius Ng, Markham (CA); Randolph Villarroel, Brampton (CA)

(73) Assignee: Intier Automotive Inc., Newmarket, Ontario (CA)

( * ) Notice: Subject to any disclaimer, the term of this patent is extended or adjusted under 35 U.S.C. 154(b) by 304 days.

(21) Appl. No.: 11/909,355

(22) PCT Filed: Apr. 6, 2006

(86) PCT No.: PCT/CA2006/000519

§ 371 (c)(1),
(2), (4) Date: Sep. 21, 2007

(87) PCT Pub. No.: WO2006/105657

PCT Pub. Date: Oct. 12, 2006

(65) Prior Publication Data

US 2009/0230746 A1   Sep. 17, 2009

(30) Foreign Application Priority Data

May 2, 2005   (CA)   .................................... 2506040

(51) Int. Cl.
*B60N 2/48* (2006.01)
(52) U.S. Cl. .................................. 297/367; 297/378.12
(58) Field of Classification Search ......... 297/365–368, 297/378.12
See application file for complete search history.

(56) References Cited

U.S. PATENT DOCUMENTS 4,348,050 A   9/1982   Letournoux et al.

(Continued)

FOREIGN PATENT DOCUMENTS

| CA | 2511897 A1 | 1/2006 |
|---|---|---|
| FR | 2 832 675 | 5/2003 |
| FR | 2 873 633 | 2/2006 |

OTHER PUBLICATIONS

European Search Report Dated Nov. 5, 2009.

*Primary Examiner*—Laurie K Cranmer
(74) *Attorney, Agent, or Firm*—Clark Hill PLC (57) ABSTRACT

A vehicle seat has a seat back and a seat cushion and a pair of recliners hingedly mounting the seat back to the seat cushion providing pivotal movement of a seat back relative to a seat cushion. Each of the recliners has a guide plate configured to be mounted to the seat cushion and a toothed plate rotatably assembled to the guide plate. The toothed disc has a flange having a series of internal teeth thereon. A plurality of pawls is mounted between the toothed plate and the guide plate. The pawls each has a toothed surface and is moveable between a locked position with the toothed surfaces engaging the series of teeth to lock the toothed plate relative to the guide plate, and an unlocked position with the toothed surfaces spaced from the teeth of the guide plate to allow movement of the toothed plate relative to the guide plate. A plurality of guides extends from the guide plate, guiding the pawls between the locked and unlocked positions. A cam is rotatably mounted between the guide plate and the toothed plate. The cam has a cam surface defined by a plurality of lobes for selective engagement with the pawls, selectively moving the pawls between the locked and unlocked positions. A spring continuously biases the cam, urging the pawls toward the locked position. A bushing is secured to the cam. The cam and the bushing have a lost motion connection therebetween. A rod extending through the bushing on each of the recliners to gang the recliners together for simultaneous operation. The guide plate and the toothed plate have abutments that limit relative rotational travel therebetween.

12 Claims, 5 Drawing Sheets

U.S. PATENT DOCUMENTS

| | | | |
|---|---|---|---|
| 6,024,410 A * | 2/2000 | Yoshida | 297/301.1 |
| 6,095,608 A * | 8/2000 | Ganot et al. | 297/367 R |
| 6,402,249 B1 | 6/2002 | Rohee et al. | |
| 6,619,744 B2 * | 9/2003 | Reubeuze | 297/378.12 |
| 6,634,713 B2 | 10/2003 | Nonomiya et al. | |
| 6,726,281 B2 * | 4/2004 | Baloche | 297/367 R |
| 6,843,533 B1 * | 1/2005 | Miyata et al. | 297/367 R |
| 6,910,737 B2 | 6/2005 | Hosokawa | |
| 6,910,738 B2 | 6/2005 | Bonk | |
| 7,195,318 B2 * | 3/2007 | Cha et al. | 297/367 R |
| 7,261,379 B2 * | 8/2007 | Volker et al. | 297/367 R |
| 2002/0050733 A1 * | 5/2002 | Hansel et al. | 297/367 |
| 2002/0096924 A1 | 7/2002 | Reubeuze | |
| 2005/0035640 A1 | 2/2005 | Shinozaki | |

\* cited by examiner

VEHICLE SEAT AND A DISC RECLINER THEREFOR

FIELD OF INVENTION

The subject invention relates to a recliner assembly used in automobile seats for adjustment of a seat back relative to a seat cushion. In particular, this invention relates to a disc recliner and a seat incorporating such a recliner assembly.

BACKGROUND OF INVENTION

Automotive vehicles include vehicle seat assemblies for supporting a seated occupant in the vehicle. The seat assemblies comprise a generally horizontal seat cushion and a seat back pivotally connected to the seat cushion by a recliner assembly, allowing adjustment of the seat back relative to the seat cushion between a plurality of recline positions. Further, the recliner assembly typically allows the seat back to be folded flat against the seat cushion.

Disc recliners are well known in the vehicle seating art and are commonly used to pivotally connect a seat back to a seat cushion. Disc recliners commonly include a fixed cylindrical inner disc fixedly secured to the seat cushion and a cylindrical outer disc fixedly secured to the seat back and rotatably coupled to the inner disc. Disc recliners further include a locking mechanism for maintaining the angular position of the seat back relative to the seat cushion. The locking mechanism typically comprises an annular rim of teeth on the outer disc and several pawls each with a plurality of teeth. The pawls are moveable, either sliding or pivoting, in a radial direction between a locked position and an unlocked position. With the pawls in the locked position, the teeth on the pawls are interlocked with the rim of teeth on the outer disc, thus locking the angular position of the seat back relative to the seat cushion. When the pawls are moved from the locked position to the unlocked position, the teeth on the pawls are no longer interlocked with the rim of teeth on the outer disc, thus allowing adjustment of the seat back relative to the seat cushion.

It is often desirable to have a vehicle seat with a seat back that is moveable from a seating position to a forwardly dump position for allowing passengers to pass to the rear seats. Thus the seat back must have a defined range of motion. In prior art recliners, brackets that mount the recliner to the seat back and seat cushion are configured to have stops that limit the motion of the seat back relative to the seat cushion. These additional components add to the cost of the recliner, which in the current automotive supply industry is highly undesirable. Alternatively, tabs are formed on the inner and outer discs to define a range of motion.

Further, recliners of the prior art are normally ganged together so that only one release lever is required to operate the seat. When the occupant manipulates the lever to adjust the relative angle of the seat back or other desired operation, the recliners on both sides of the seat are simultaneously activated. A problem arises when prior art seats are manufactured. If the recliner on the inboard side is not perfectly aligned with and extending parallel to the recliner on the outboard side, the recliners will not be properly mounted on the rod joining or ganging the recliners. Improper mounting causes the recliners to bind increasing the effort required to operate the seat. Imperfect alignment is common within normal acceptable build tolerances.

SUMMARY OF INVENTION

The disadvantages of the prior art may be overcome by providing a recliner assembly, which allows adjustment of the seat back relative to the seat cushion between a plurality of reclined seating positions and further has internal means for limiting travel and is capable of being assembled into a vehicle seat while maintaining minimal operation efforts.

In the preferred embodiment, a vehicle seat has a seat back and a seat cushion and a pair of recliners hingedly mounting the seat back to the seat cushion providing pivotal movement of a seat back relative to a seat cushion. Each of the recliners has a guide plate configured to be mounted to the seat cushion and a toothed plate rotatably assembled to the guide plate. The toothed disc has a flange having a series of internal teeth thereon. A plurality of pawls is mounted between the toothed plate and the guide plate. The pawls each has a toothed surface and is moveable between a locked position with the toothed surfaces engaging the series of teeth to lock the toothed plate relative to the guide plate, and an unlocked position with the toothed surfaces spaced from the teeth of the guide plate to allow movement of the toothed plate relative to the guide plate. A plurality of guides extends from the guide plate, guiding the pawls between the locked and unlocked positions. A cam is rotatably mounted between the guide plate and the toothed plate. The cam has a cam surface defined by a plurality of lobes for selective engagement with the pawls, selectively moving the pawls between the locked and unlocked positions. A spring continuously biases the cam, urging the pawls toward the locked position. A bushing is snappingly secured to the cam. The cam and the bushing have a lost motion connection therebetween. A rod extending through the bushing on each of the recliners to gang the recliners together for simultaneous operation. The guide plate and the toothed plate have abutments that limit relative rotational travel therebetween.

In a further aspect of the invention, there is provided a bushing that is configured to enable an additional degree of freedom between the rod and the two recliners, compensating for misalignment, either axial or planar, between recliners as a result of build tolerances.

In a yet further aspect of the invention, there is provided a toothed plate and a guide plate, each having an abutment that is arranged to engage the other abutment to limit rotational travel between the guide plate and the toothed plate.

In yet another aspect of the invention, there is provided a pawl for a recliner. The pawl has pawl body and an arcuate periphery. The arcuate perimeter has a toothed surface thereon. The arcuate periphery is wider than the pawl body increasing contact between the pawl and the toothed plate.

BRIEF DESCRIPTION OF DRAWINGS

The foregoing and other aspects of the invention will become more apparent from the following description of illustrative embodiments thereof and the accompanying drawings, which illustrate, by way of example only, the principles of the invention. In the drawings.

DETAILED DESCRIPTION OF PREFERRED EMBODIMENTS

Figure 1:
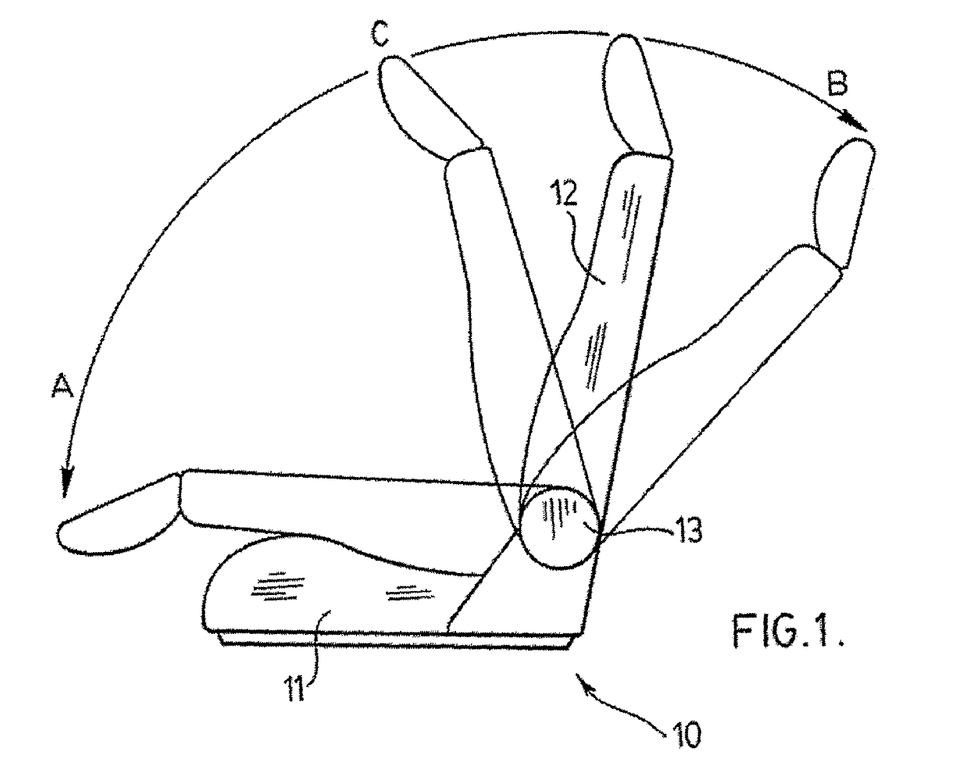
FIG. 1 is a side elevational view of a vehicle seat according to the preferred embodiment.

Referring to the Figures, FIG. 1 discloses a seat assembly 10 for use in an automotive vehicle. The seat assembly 10 includes a generally horizontal seat cushion 11 and a seat back 12. Each of the seat cushion 11 and seat back 12 typically comprises a rigid frame structure for supporting a contoured, foam pad encased by a trim cover as conventionally known to one skilled in the art. The seat assembly 10 also includes a recliner assembly 13 operatively interconnecting the seal cushion 11 and seat back 12 for pivotal movement of the seat back 12 between a plurality of reclined positions. Further, the recliner assembly 13 allows pivotal movement of the seat back 12 to a forwardly folded position, as shown at A in FIG. 1. Preferably, the seat back 12 is biased towards the forwardly folded position.

Figure 2:
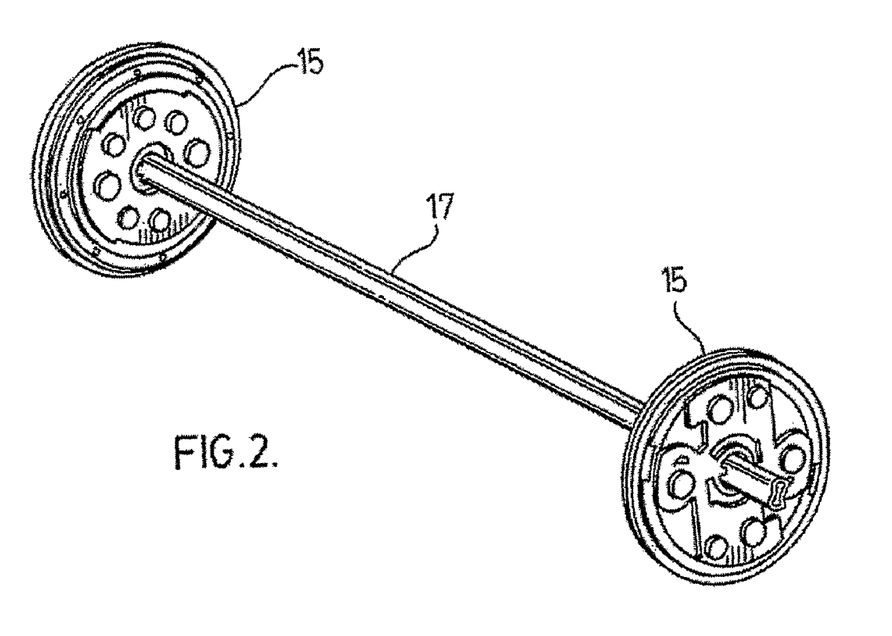
FIG. 2 is a perspective view of the recliner assembly of the vehicle seat of FIG. 1.

Referring to FIG. 2, the recliner assembly 13 of the present invention is generally illustrated. The recliner assembly 13 comprises a pair of disc recliners 15 coupled or ganged together by a rod 17, which is preferably hollow. Both the inboard and outboard disc recliners 15 are symmetrically opposite, which minimizes tooling and ultimately costs.

Figure 3:
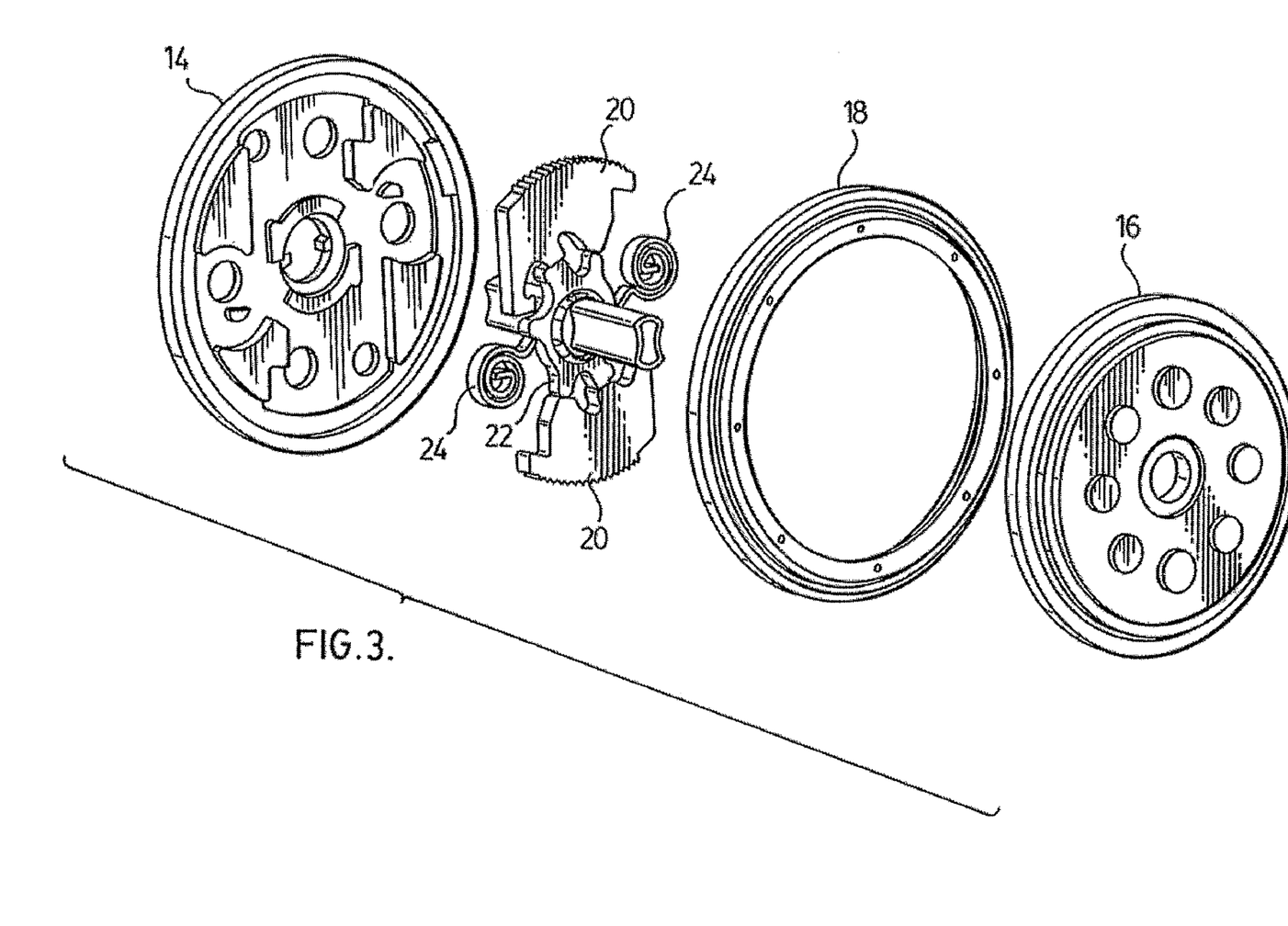
FIG. 3 is an exploded perspective view of the recliner of FIG. 1.

Referring to FIG. 3, the disc recliner 15 is illustrated in detail. Disc recliner 15 generally comprises a guide plate 14, a toothed plate 16, a retaining ring 18, a pair of toothed pawls 20, a cam 22 and a pair of springs 24. The guide plate 14 and the toothed plate 16 are held together by the retaining ring 18 in a manner well known in the art.

Figure 4:
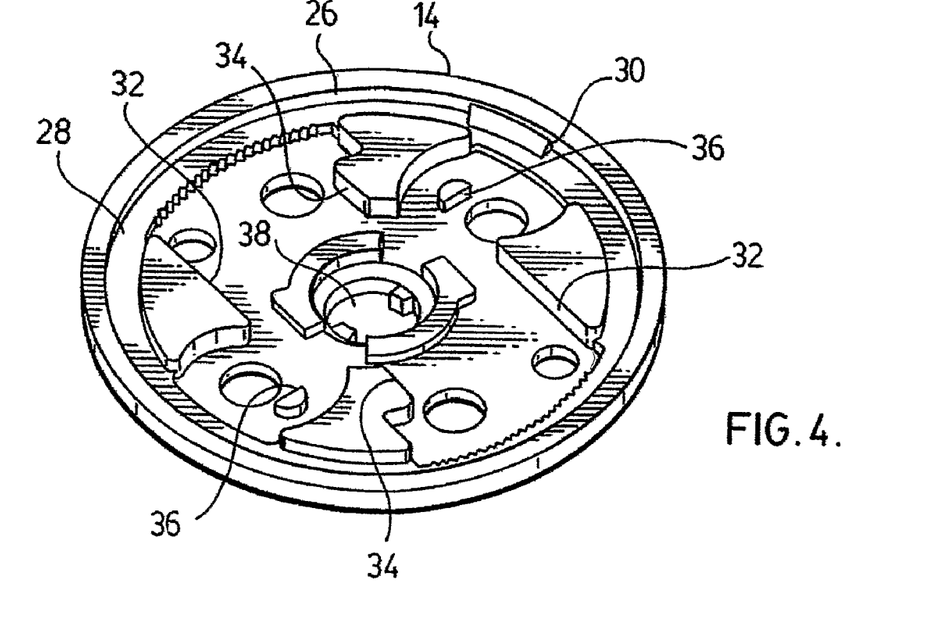
FIG. 4 is a perspective view of a guide plate of the recliner of FIG. 3.

Referring to FIG. 4, the guide plate 14 is generally cup shaped with an outer flange 26, defining an inner circumferential slot or track 28. Positioned in the track 28 is an abutment 30, presenting a stop. Spaced about the bottom surface of the guide plate 14 are a series of islands that define a first guide surface 32 and a second guide surface 34. The first and second guide surfaces 32, 34 cooperate with the pawls 20 to limit travel thereof to a radial direction. First guide surface 32 is longer in length than the second guide surface 34, configuring the guide plate 14 to receive the "hammerhead" shape of the pawls 20.

A pair of diametrically opposed stubs 36 are positioned normal to the direction of the travel of the pawls 20. Stubs 36 receive springs 24 to provide a biasing force to the cam 22.

The central bore of plate 14 has a pair of diametrically opposed tabs 38. Tabs 38 engage with bushing 76 and provide a lost motion connection to the rod 17, defining limits of rotation of the rod 17 relative to the guide plate 14, as discussed in further detail below.

Figure 5:
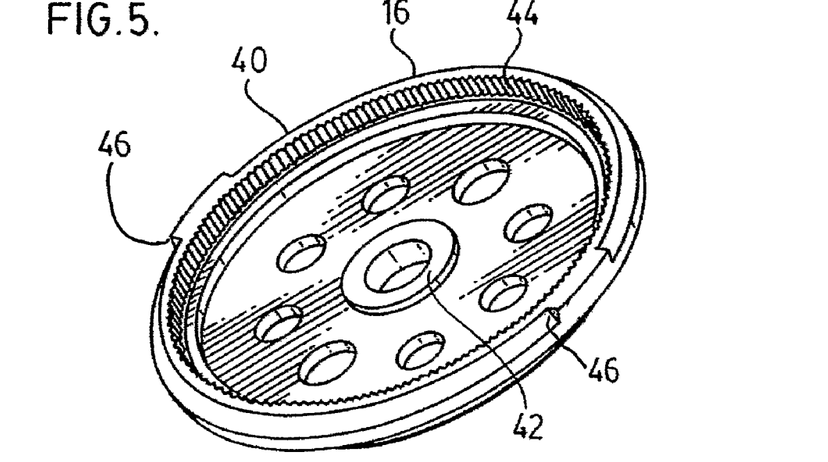
FIG. 5 is a perspective view of a toothed plate of the recliner of FIG. 3

Referring to FIG. 5, the toothed plate 16 is generally illustrated. The toothed plate 16 is generally cup shaped having an axially extending flange 40 and a central bore 42. The inner surface of the flange 40 has a series of spaced teeth 44. The outer surface of the flange 40 is tapered with a pair of diametrically opposed abutments 46. The flange 40 is sized to fit in the track 28 of guide plate 14, enabling the toothed plate 16 to rotate relative to the guide plate 14. As the toothed plate 16 rotates in either direction, abutments 46 with engage with abutment 30 on guide plate 14, thereby providing a travel stop and limiting travel to about 180°.

Figure 6:
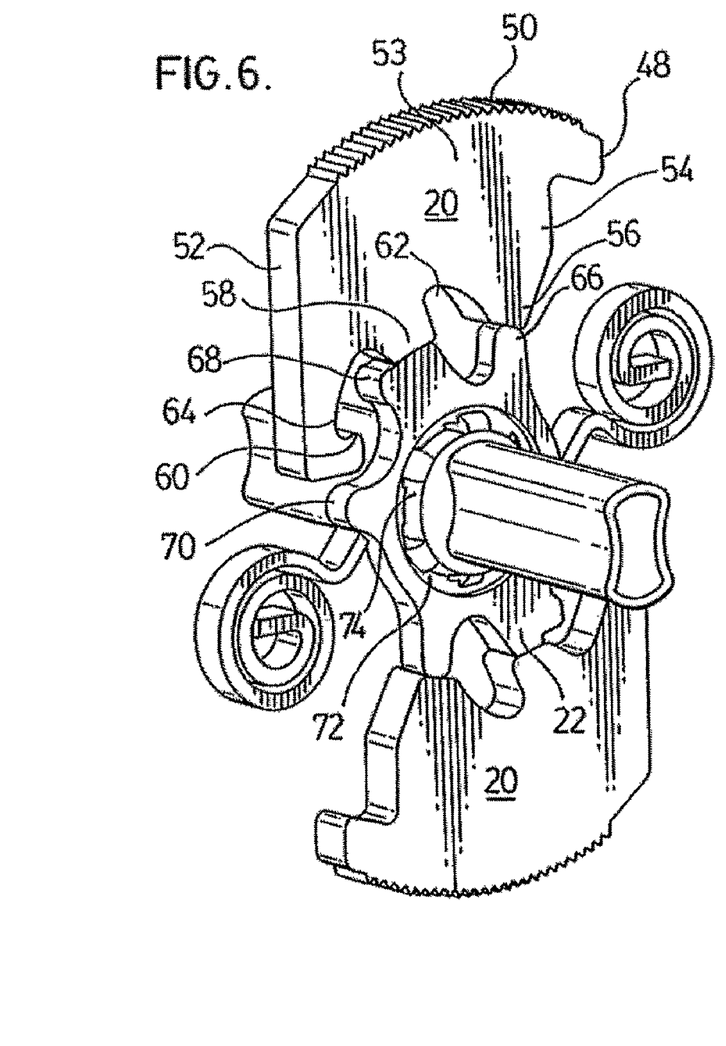
FIG. 6 is partial perspective view of the cam and pawl arrangement of the recliner of FIG. 3.

Referring to FIG. 6, the pawls 20 have a "hammerhead" shape, in that the outer arcuate periphery 48 is wider than the pawl body 53. The outer periphery 48 has a series of teeth 50 that are complementary to the teeth 44 on toothed plate 16. The slide body has a first slide surface 52 that slidingly engages with first guide surface 32 and a second slide surface 54 that slidingly engages with second guide surface 34. Slide surfaces 52, 54 are on opposite sides of the pawl body 53 and extend generally parallel to each other. Slide surface 52 is longer in length than slide surface 54. The inner peripheral edge of pawls 20 has a cam follower surface defined by lobes or locking surfaces 56, 58 and release hook 60, interposed with recesses 62, 64.

The "hammerhead" shape of the pawls 20 is preferred since the circumferential length of contact between the pawls 20 and the teeth 44 is increased without increasing the width of the pawl body 53.

The cam 22 has a cam surface defined by lobes or locking surfaces 66, 68 interposed with recesses. The cam surface is complementary to the cam follower surface of the pawls 20, whereby the cam 22 initially urges the pawls outwardly to lockingly engage the pawls 20 with the toothed plate 16 (a locked condition) and as the cam 22 rotates, the pawls 20 can move radially inward until locking surface 68 engages release hook 60 to positively urge the pawls 20 to move radially inward (an unlocked condition) disengaged from the teeth 44.

The engagement between the locking surface 68 and locking surface 58 provides the majority of the locking force to retain the pawls in engagement with the teeth 44. The engagement between the locking surface 66 and locking surface 56 provide an anti-tipping force maintaining the pawls 20 in alignment and preventing binding and the pawls 20 move between the locked position and the unlocked position.

Cam 22 also has a pair of diametrically opposed spring tabs 70, which are positioned to engage with springs 24 to provide biasing of the cam 22 towards the locked condition.

Cam 22 has a central bore 72 having a series of circumferentially spaced tabs 74.

Figure 7:
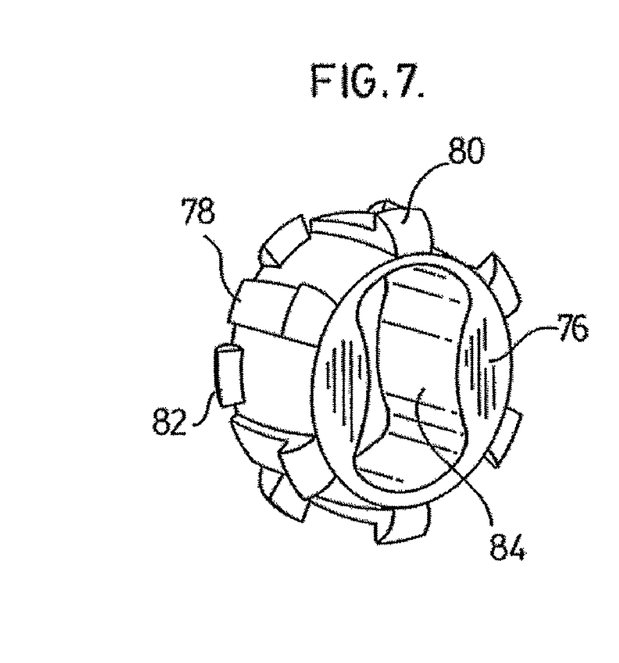
FIG. 7 is perspective view of the bushing of the recliner of FIG. 3.

Bushing 76 is inserted into the central bore 72. Bushing 76 has an outer peripheral surface that is bowed outwardly, i.e. the diameter of the outer surface is greater at a midpoint than at the inner and outer surfaces. The outer circumferential surface has a series of circumferentially spaced ridges or splines 78. The circumferential width of each spline 78 is less than the circumferential width of the spacing between tabs 74 on cam 22 and fits therebetween. This spacing provides a lost motion connection between the bushing 76 and the cam 22. Bushing 76 is able to rotate relative to the cam 22 before the spline 78 of bushing 76 engages the tabs 74 of cam 22 in a driving relation. Further rotation of the bushing 76 drives the cam 22 in rotation.

The splines 78 are arcuate and each has a tapered hook 80 on the outer surface and each recess has a tapered hook 82, which configuration enables the bushing 76 to be snap fitted into the cam 22 and be retained thereon.

For cost reduction, one of either the tapered hooks 80 or 82 could be omitted. The bushing 76 is merely held in place by the guide plate 14 and the toothed plate 16 after the disc recliner 15 has been assembled.

The bushing 76 has a central aperture 84 that is configured to complementarily receive the rod 17 in a driving fit. Preferably, bushing 76 is injection molded with an organic resin material, such as NYLON™.

Bushing 76 has an arcuate outer surface that contacts with the cam 22, which relation is a ball and socket joint. Thus, bushing 76 is capable of rotating relative to and out of plane with the cam 22, enabling the bushing 76 to receive the rod 17 with a greater degree of freedom and thereby compensate for differences in orientation and/or build tolerances between the inboard and outboard recliners 15.

Alternatively, the central aperture 84 could have an arcuate inner surface that contacts the rod 17, enabling the bushing 76 to receive the rod 17 with a greater degree of freedom and thereby compensate for differences in orientation and/or build tolerances between the inboard and outboard recliners 15.

Rod 17 is illustrated as a hollow rod having a figure "8"-like configuration and central aperture 84 as a complementary configuration. However, it is now apparent to those skilled in the art that the rod 17 could have any conventional configuration to provide a driving connection between the rod 17 and the bushing 76, ganging the operation of the inboard and outboard recliners 15.

Figure 8:
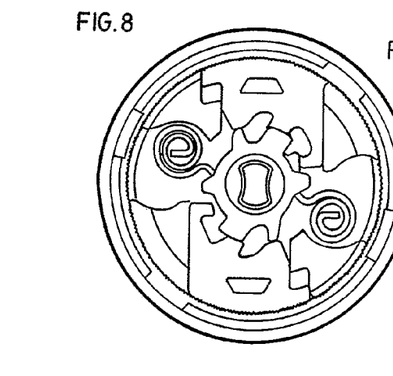
FIG. 8 is side elevational view of an inboard recliner in a locked condition.
Figure 9:
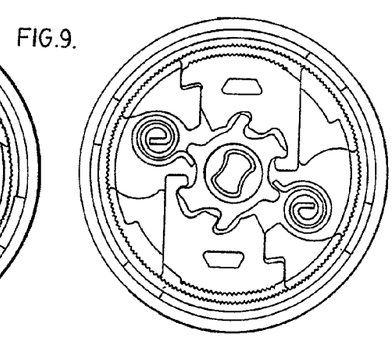
FIG. 9 is side elevational view of an inboard recliner in an unlocked condition.
Figure 10:
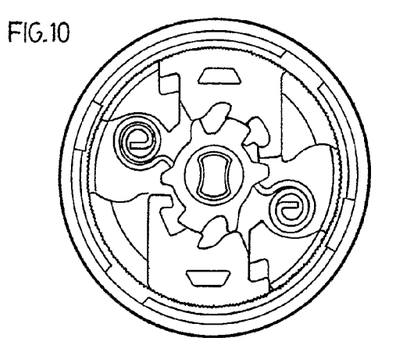
FIG. 10 is side elevational view of an inboard recliner returned to a locked condition.

Referring to FIGS. 8 (locked), 9 (unlocked) and 10 (locked), the bushing 76 will drive open the cam 22 and the cam 22 will release the pawls 20 from the lock condition. When returning to the locked position, the springs 24 wall drive the cam 22 and pawls 20 to the locked condition and the bushing 76 will follow to the "home" position.

Figure 11:
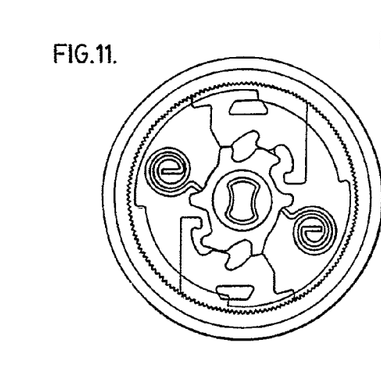
FIG. 11 is side elevational view of an outboard recliner in a locked condition.
Figure 12:
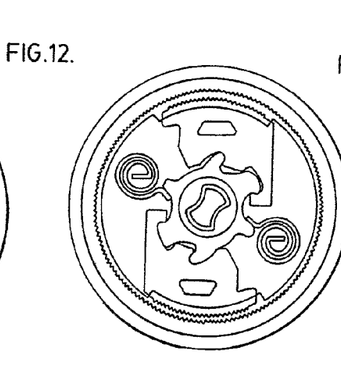
FIG. 12 is side elevational view of an outboard recliner in a unlocked condition.
Figure 13:
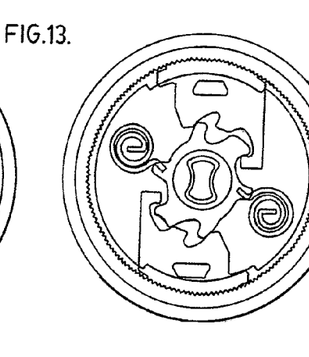
FIG. 13 is side elevational view of an outboard recliner in a partially locked condition.
Figure 14:
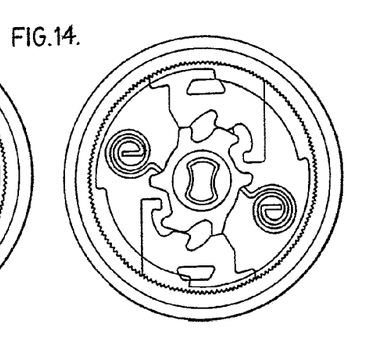
FIG. 14 is side elevational view of an outboard recliner returned to a locked condition.

Referring to FIGS. 11 (locked), 12 (unlocked), 13 (partially locked) and 14 (locked), if the pawls 20 and cam 22 are, for any reason, unable to reach the locked position, the bushing 76 is free to rotate to the "home" position due to the lost motion connection and does not prevent the opposite recliner from locking. This feature allows the two recliners 15 to lock when each of the toothed guides 16 is aligned with the respective pawls 22, without binding.

The present invention has been illustrated with two pawls 20. However, it is apparent to those skilled in the art that the recliner 15 could easily be re-configured to a three pawl version, wherein the three pawls are equally spaced circumferentially and the cam 22 has three corresponding pawl engaging surfaces. Additionally, the recliner 15 could easily be configured to have the pawls 20 pivoting between the locked and unlocked conditions.

The invention has been described in an illustrative manner, and it is to be understood that the terminology, which has been used, is intended to be in the nature of words of description rather than of limitation. Many modification and variations of the present invention are possible in light of the above teachings. It is, therefore, to be understood that within the scope of the appended claims, the invention may be practiced other than as specifically described.

The invention claimed is:

1. A recliner for providing pivotal movement of a seat back relative to a seat cushion of an automotive vehicle seat, said recliner comprising:

a guide plate configured to be mounted to said seat cushion, said guide plate having a center bore;

a toothed plate rotatably assembled to said guide plate and configured to be mounted on said seat back, said toothed plate having a flange having a series of internal teeth thereon and having a center bore coaxial with said center bore of said guide plate;

a plurality of pawls mounted between said toothed plate and said guide plate, said pawls each having a toothed surface and moveable between a locked position with said toothed surfaces engaging said series of teeth of said toothed plate to secure said toothed plate relative to said guide plate, and an unlocked position with said toothed surfaces spaced from said teeth of said toothed plate to allow movement of said toothed plate relative to said guide plate;

a plurality of guides extending from said guide plate, said guides receiving said pawls and guiding said pawls between said locked and unlocked positions;

a cam rotatably mounted between said guide plate and said toothed plate, said cam having a cam surface defined by a plurality of lobes for selective engagement with said pawls, selectively moving said pawls between said locked and unlocked positions as said cam rotates;

a spring continuously biasing said cam, said cam urging said plurality of pawls toward said locked position; and a bushing engaging said cam, said cam and said bushing having a lost motion connection therebetween enabling limited relative rotation before said bushing engages said cam in a driving relation, said cam having a central bore defining a center axis coaxial with said center bore of said guide plate and said toothed plate and said bushing having a central aperture wherein said bushing is pivotal relative to said cam transverse to said center axis.

2. A recliner as set forth in claim 1, wherein each of said pawls has a pawl body and an arcuate periphery, said arcuate periphery having said toothed surface thereon and said arcuate periphery being wider than said pawl body.

3. A recliner as set forth in claim 2, wherein said pawl body of each of said pawls has a first slide surface and a second slide surface, said slide surfaces extending generally parallel to each other on opposite sides of said pawl body, each of said slide surfaces engaging one of said plurality of guides.

4. A recliner as set forth in claim 3, wherein said first slide surface is longer than said second slide surface.

5. A recliner as set forth in claim 1, wherein said recliner further comprises an abutment on said guide plate and an abutment on said toothed plate wherein said abutments engage to limit relative rotational travel between the toothed plate and the guide plate.

6. A recliner as set forth in claim 5, wherein said at least one of said guide plate and said toothed plate has two abutments.

7. A recliner as set forth in claim 6, wherein said abutments are positioned to limit rotational travel between said guide plate and said toothed plate to about 180°.

8. A vehicle seat comprising a seat back and a seat cushion and a pair of recliners hingedly mounting said seat back to said seat cushion providing pivotal movement of a seat back relative to a seat cushion, each of said recliners comprising:

a guide plate configured to be mounted to said seat cushion, said guide plate having a center bore;

a toothed plate rotatably assembled to said guide plate and configured to be mounted on said seat back, said toothed plate having a flange having a series of internal teeth thereon and having a center bore coaxial with said center bore of said guide plate;

a plurality of pawls mounted between said toothed plate and said guide plate, said pawls each having a toothed surface and moveable between a locked position with said toothed surfaces engaging said series of teeth of said toothed plate to secure said toothed plate relative to said guide plate, and an unlocked position with said toothed surfaces spaced from said teeth of said toothed plate to allow movement of said toothed plate relative to said guide plate;

a plurality of guides extending from said guide plate, said guides receiving said pawls and guiding said pawls between said locked and unlocked positions;

a cam rotatably mounted between said guide plate and said toothed plate, said cam having a cam surface defined by a plurality of lobes for selective engagement with said pawls, selectively moving said pawls between said locked and unlocked positions;

a spring continuously biasing said cam, said cam urging said plurality of pawls toward said locked position;

a rod ganging said pair of recliners together; and a bushing engaging said cam, said cam and said bushing having a lost motion connection therebetween, said cam having a central bore defining a center axis coaxial with said center bore of said guide plate and said toothed plate and said bushing having a central aperture wherein said bushing is pivotal relative to said cam transverse to said center axis; and said rod extending coaxially through central aperture of each of said bushing on each of said recliners in a driving relation.

9. A vehicle seat as set forth in claim 8, wherein said recliners each includes an abutment on said guide plate and an abutment on said toothed plate wherein said abutments engage to limit relative rotational travel therebetween.

10. A vehicle seat as set forth in claim 8, wherein each of said pawls has a pawl body and an arcuate periphery, said arcuate periphery having said toothed surface thereon and said arcuate periphery being wider than said pawl body.

11. A vehicle seat as set forth in claim 8, wherein said bushing is configured to enable said rod to rotate and commonly drive each of said recliners when said recliners are aligned and are parallel to each other within build tolerances.

12. A vehicle seat as set forth in claim 8, wherein said lost motion connection enables the pawls of one of said recliners to be moved into the locked condition without driving the pawls of the other of said recliners into the locked condition.

* * * * *